United States Patent [19]

De Lorean

[11] 4,253,510
[45] Mar. 3, 1981

[54] INTEGRAL WHEEL AND PNEUMATIC TIRE

[76] Inventor: John Z. De Lorean, 280 Park Ave., New York, N.Y. 10017

[21] Appl. No.: 86,900

[22] Filed: Oct. 22, 1979

[51] Int. Cl.³ .............................................. B60B 9/00
[52] U.S. Cl. ...................................... 152/9; 152/380; 301/6 CS
[58] Field of Search ................. 152/8, 9, 10, 375, 379, 152/380; 301/6 CS, 37 P, 37 R

[56] References Cited

U.S. PATENT DOCUMENTS

| 600,162 | 3/1898 | Morris | 152/380 |
|---|---|---|---|
| 3,062,254 | 11/1962 | Keefe | 152/9 |
| 3,606,921 | 9/1971 | Grawey | 152/361 R |
| 3,762,677 | 10/1973 | Adams | 301/37 P |

FOREIGN PATENT DOCUMENTS 405790  2/1934  United Kingdom ..................... 152/380

*Primary Examiner*—H. Grant Skaggs
*Attorney, Agent, or Firm*—Reising, Ethington, Barnard, Perry & Brooks

[57] ABSTRACT

Integral pneumatic tire and wheel assembly wherein the tire is molded upon and bonded to wheel to eliminate need for decorative separate wheel cover and also provides a limited and non-destructive run-flat capability.

3 Claims, 3 Drawing Figures

INTEGRAL WHEEL AND PNEUMATIC TIRE

TECHNICAL FIELD

The present invention relates to a unique integral pneumatic tire and wheel assembly wherein the tire is molded directly upon and bonded to the wheel in such a way as to eliminate the need for a conventional wheel cover or a decorative wheel and, further, wherein the wheel and tire are formed in such a way as to have a limited and non-destructive run-flat capability.

BACKGROUND ART

Prior to the present invention, it has been conventional practice for automotive and other heavy-duty applications to removably mount a pneumatic tire upon a wheel. Particularly with respect to automobiles, it has been the practice to make such wheels of multi-part, stamped components suitably secured together as by welding and to the outer face of which a suitable metal wheel cover is normally applied for decorative purposes. Alternatively, such wheels may be of an even more costly single or multi-part casting with the decorative or design features formed as a part thereof. It has likewise been a part of typical prior art practice to form such wheels with drop-center rims, e.g. the rim being radially depressed inwardly toward the axis of rotation of the wheel and with the tire being mounted and supported upon the transversely spaced inner and outer edges of the rim.

Tires mounted on wheels having drop-center type rims normally have little run-flat capability and frequently such tires are severely damages by the time a moving vehicle with a deflated tire is brought to a stop.

DISCLOSURE OF THE INVENTION

It is the purpose of the present invention to provide an integral tire and wheel assembly which has a limited run-flat capability and which, therefore, can eliminate the need for a spare tire. Such assembly is also made in a way as to eliminate the need for the typical separate wheel cover. By utilizing a low cost, one-piece wheel in combination with a pneumatic tire having an integral wheel covering portion, at such time as the pneumatic tire is no longer useable or repairable the integral tire and wheel may be replaced as a unit.

More specifically, the present invention includes a low cost, single-piece wheel formed in such a way as to have a substantial area to which a reinforced pneumatic tire is molded to eliminate the need for the traditional separate wheel cover and, further, which tire is bonded to the wheel in a manner that the tire will not separate from the wheel and be damaged when the tire is operated for a limited time in a deflated condition.

While the invention is applicable to more conventionally formed vehicle tires, it is particularly useful with improved high performance tires of the type shown in U.S. Pat. Nos. 3,606,921 and 3,999,585 issued to C. E. Grawey.

BEST MODE FOR CARRYING OUT THE INVENTION

Figure 1:
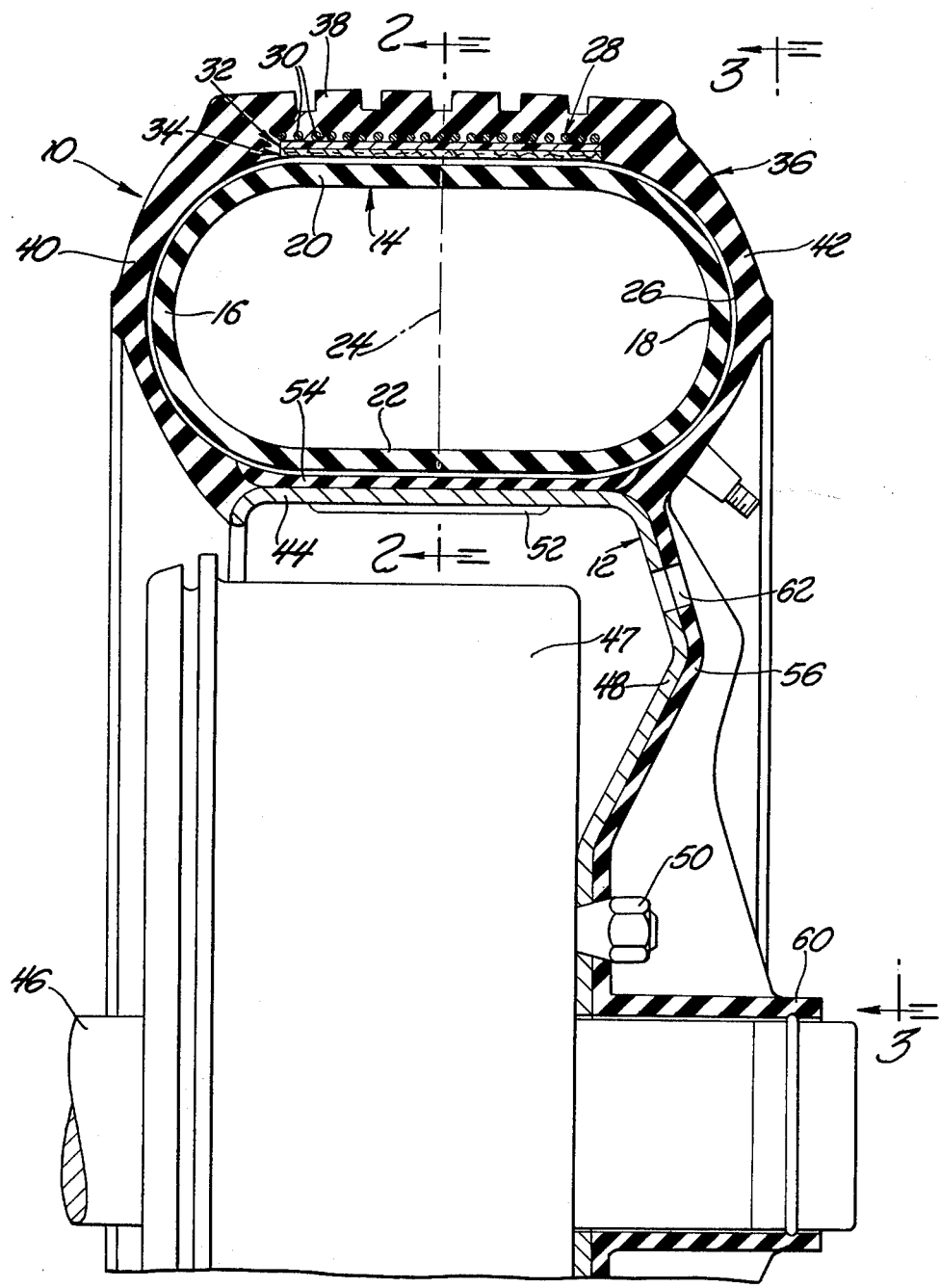
FIG. 1 is a partially sectioned side elevation view of the subject integral tire and wheel assembly.
Figure 2:
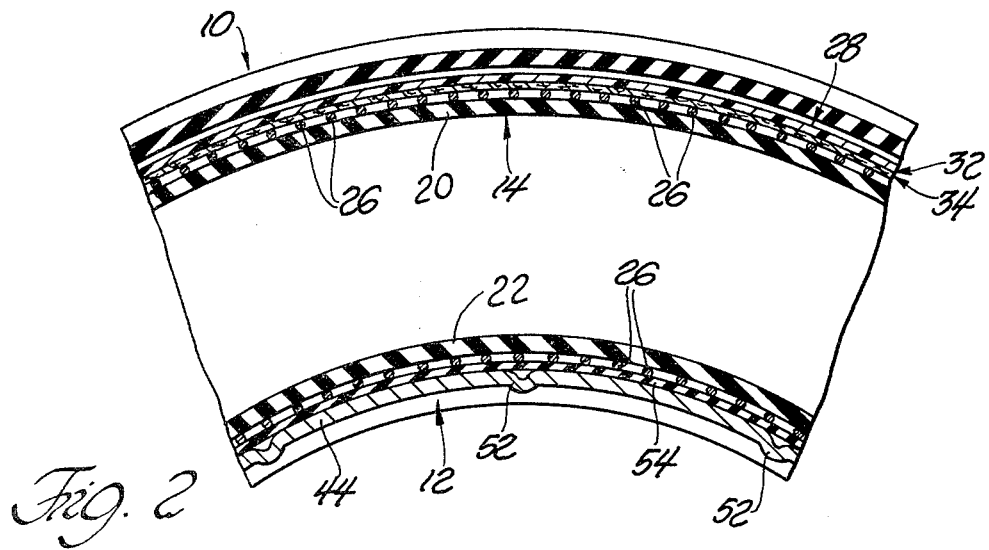
FIG. 2 is a sectional view along line 2—2 of FIG. 1.

Referring particularly to FIG. 1, a pneumatic tire is indicated generally at 10 and the associated wheel at 12.

For illustrative purposes, the pneumatic portion of tire 10 will be described as being made in accordance with the methods and structures set forth in U.S. Pat. Nos. 3,606,921 Grawey and/or 3,999,585 Grawey.

Tire 10 includes an annular or toroidal tube member 14 formed of a suitable elastomeric material. Tube member 14, as initially formed, is of the shape shown in FIG. 1 and includes arcuate side wall portions 16 and 18 connected by a relatively flat upper crown portion 20 and lower rim wall portion 22. Tube member 14 includes a mid-circumferential plane 24 essentially vertical or normal to the axis of rotation of the tire and about which plane the pneumatic portion of the tire is generally symmetrically formed.

As noted in U.S. Pat. No. 3,606,921, tube 14 may be formed by wrapping layers of uncured elastomer about a pre-formed rigid core element (not shown) having the external shape of the tube as illustrated in FIG. 1. The rigid core element may be of any suitable material which is ultimately capable of being disintegrated and removed through the valve stem opening of the tube by the technique described in the aforementioned patent. Tube member 14 may be formed of a butyl rubber having the requisite durometer, tensile strength and elongation.

Tube member 14 may be cured after being formed about the rigid core element or may be subsequently cured during the vulcanization of the tire carcass. If it is cured before the buildup and curing of the tire carcass, tube member 14 must be cleaned and its outer surface buffed to insure proper adhesion to the other elements used in forming the tire carcass. Buffing is not necessary if the tube member is not cured before the curing of the tire carcass.

In order to maintain tube member 14 basically in the shape shown in FIG. 1 when the tire is inflated and in use, a plurality of reinforcing plies may be incorporated in the tire structure. For example, a first reinforcing ply is formed of a plurality of loops 26 wrapped about tube member 14. Loops 26 are formed from a continuous wire or cord element applied by a winding machine (not shown) but a type of which is illustrated in U.S. Pat. No. 3,606,921. At the time of wrapping loops 26 about tube 14, the tube is filled with the removable rigid core material which, as noted, is ultimately disintegrated and removed through one or more pneumatic valve stem openings 28 in the manner described by Grawey.

The material from which loops 26 are formed may be of suitable metal, glass, or synthetic fiber and which material is selected as to have a total elongation of 5% or less and is thus defined as inextensible. The loops 26 are circumferentially spaced as closely as is possible consistent with the difference in inner and outer diameters of tube member 14. In other words, the loops are more closely spaced at the inner diameter, e.g. rim wall 22, than at the outer diameter, e.g. crown portion 20.

While loops 26 have a slight helix angle, for practical purposes they may be considered to be normal to the mid-circumferential plane 24 for maximum utilization of the tensile strength of the loop material.

Next, and in order to maintain tube member 14 in its oval form, an inextensible circumferential belt or ply 28 is provided. Ply 28 is preferably formed of a continuous filament or cord having convolutions 30 which are helically wound across the outer circumference of the crown of tube member 14. Once again, while filament convolutions 30 have a slight helix, they may be considered to be generally parallel to circumferential mid-plane 24. Like radial loops 26, convolutions 30 are generally inextensible and substantially cover the width of tube crown 20.

As shown in U.S. Pat. No. 3,999,585, breaker plies 32 and 34 may be provided between circumferential belt 28 and radial loops 26. The breaker plies of each layer are laid in transversely abutting relation. The breaker ply layers are laid at equal but opposite angles with respect to circumferential mid-plane 24 with such ply angles being in the range of 10°–25° and optimally in the range of 18°–22°. Breaker ply layers 32 and 34 not only protect the tire against puncturing, but also provide horizontal rigidity to the tire and thereby lessen the tendency of the tire to squirm or roll transversely during turning.

An uncured elastomeric tire carcass 36 is formed about inner tube member 14 and reinforcing plies 26, 28, 32, and 34. Carcass 36 includes a tread portion 38 and inner and outer side wall portions 40 and 42.

While tire carcass 36 may be built up of a single elastomer, it is more common to use a plurality of compatible elastomers to form various parts of the tire. For example, it is common to use the same elastomer stock in forming the casing rim wall, casing sidewalls, and the undertread of the tire. On the other hand, a harder and tougher elastomer is normally used in the forming of tread 38.

If desired to prevent abrasion between adjacent reinforcing plies, suitable fabric or elastomeric layers or belts (not shown) may be interleaved between such plies.

Wheel 12 includes a flat or horizontal rim portion 44 which is to be distinguished from the traditional depressed or drop-center type rim construction. Elimination of the drop-center type rim has the advantage of providing greater radial clearance from the wheel axle 46, thereby allowing the use of a radially larger disc type brake 47 for more effective braking and which flat rim design also contributes to a run-flat capability as discussed below.

Wheel 12 includes a generally radial body portion 48 which extends from the outer end of rim portion 44 and terminates radially inwardly proximate wheel axle 46. While described as being generally radial, the radially outer section of wheel body portion 48 is preferably outwardly recessed or dished to strengthen the wheel and to enlarge the air-flow space between the wheel and the adjacent brake mechanism.

A plurality of studs 50 are provided for mounting wheel and tire assembly upon axle 46 through the brake mechanism 47. As seen in FIG. 1, wheel body portion 48 is laterally offset from circumferential mid-plane 24 of tire 10 toward the outer side wall 42 of tire 10 whereby wheel rim 44 is supported as an inwardly extending cantilever from the upper end thereof.

Because of the elimination of a drop-center rim as well as the laterally offset or cantilever relationship between rim 44 and wheel body portion 48, wheel 12 may be fabricated as a low cost, one-piece stamped construction. Dimples 52 are formed in rim portion 44 to rigidify this portion of wheel 12.

In order to reduce abrasion between reinforcing tire loops 26 and wheel rim 44, tire 10 includes a vulcanized rubber belt 54.

As best seen in FIG. 1, outer side wall 42 of tire 10 includes an integral and radially inwardly extending portion 56 adapted to cover the outer surface of wheel body portion 48. Tire portion 56 is intended to replace the traditional and separate metal wheel cover.

The sequence for integrally forming tire 10 upon wheel 12 is as follows: tube member 14, with its rigid core element (not shown) still in place, is wrapped or overlaid with suitable reinforcing plies such as 26, 32, 24, and 28. The uncured tire carcass 36 is then formed about the reinforced tube member 14. A suitable rubber bonding and heat curing adhesive is applied to the outer surfaces of wheel rim 44 and body portion 48. Alternatively, suitable rubber-to-steel bonding materials can be incorporated in the carcass rubber which effects a bond when tire 10 is vulcanized on wheel 12. The unvulcanized annular rubber pad or belt 54 is laid over rim 44. The uncured tire carcass 36, including wheel cover portion 56, is next placed over wheel 12 and the tire and wheel assembly placed in a suitable tire mold where the tire is cured under heat and pressure to give the tire its final external configuration. During the application of heat and pressure within the mold, tube member 14, carcass 36, and anti-abrasion belt 54 are cured or vulcanized to integrate the various tire elements. At the same time, either the adhesive or integral bonding material in the carcass rubber is cured to bond the tire 10 and its wheel cover portion 56 to wheel 12.

Since tire 10 is vulcanized and given its ultimate exterior shape while mounted on wheel 12, a portion of the tire mold conforms to the basic shape of wheel portion 48 while leaving sufficient clearance therefrom to allow wheel covering portion 56 of the tire to assume the ultimate external configuration as determined by wheel portion 48 and the coacting portion of the mold.

Figure 3:
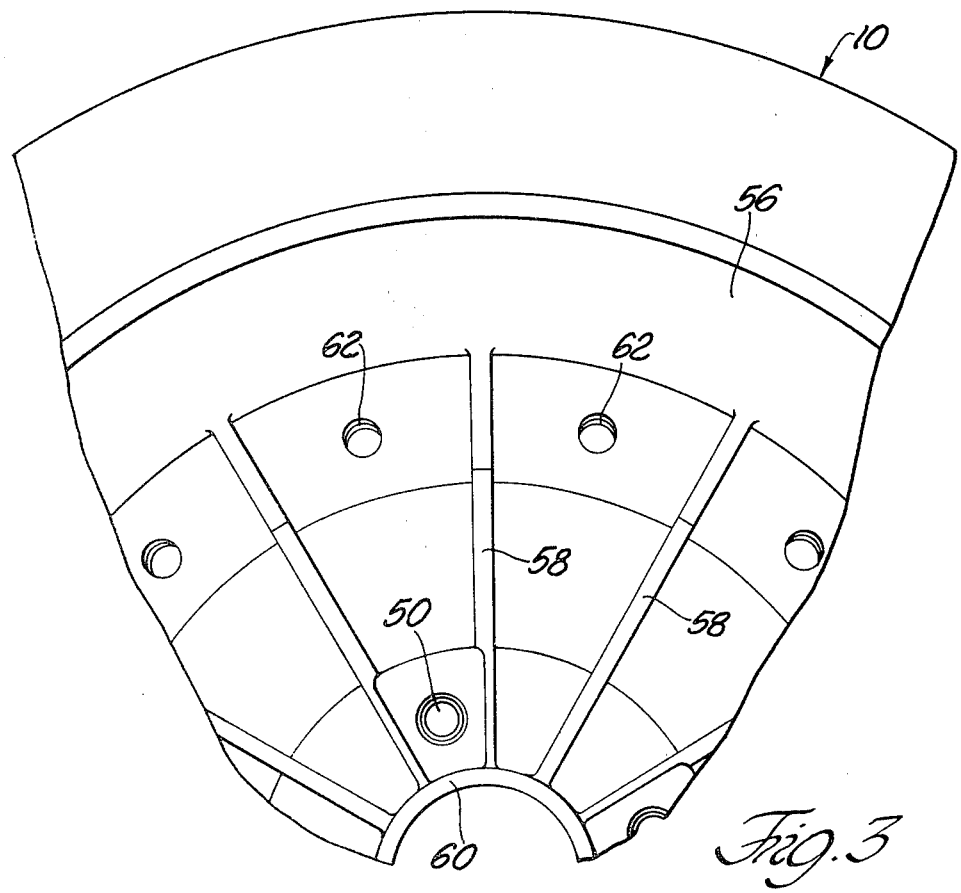
FIG. 3 is a side elevational view along line 3—3 of FIG. 1.

The tire mold, not shown, can be formed to create desired design or functional features in tire wheel cover portion 56. For example, in the illustrated configuration of FIG. 1, tire wheel cover portion 56 is formed with fins or spoke-like elements 58 which extend radially between axle hub portion 60 and the radially inner end of the outer side wall 42 of tire carcass 36. As best seen in FIGS. 1 and 3, aligned air holes 62 are formed through wheel body portion 48 and tire wheel cover portion 56 whereby, when the integral tire and wheel assembly rotates, fins 58 act as a fan to accelerate cooling air flow over brake mechanism 47. The exact external configuration of tire wheel cover portion 56 can be varied to achieve the desired aesthetic or functional configuration. For example, fins 58 can be formed to permit the incorporation of chrome inserts or the like to enhance the decorative nature of wheel cover portion 56.

By bonding tire carcass 36, including wheel cover portion 56, both to the wheel rim 44 and wheel body portion 48, tire 10 will not come off wheel 12 if deflated, thereby giving the tire a limited run-flat capability. The run-flat capability of tire 10 is also enhanced by the flat or horizontal design of wheel rim 44. Being flat, rim 44 supports tire 10 throughout a major portion of its width even when deflated. This wide width support is to be contrasted with a conventional drop-center rim wherein, when deflated, the tire is supported only at the transversely spaced outer edges of the rim, which not only provides little support for the deflated tire but also creates relatively sharp or narrow edges which tend to shred a tire carcass before a vehicle can be brought to a halt.

Part of the rapid disintegration which occurs when a tire goes flat on a moving vehicle is due to the tire becoming partially separated from, or at least being free to move relative to the wheel, causing the tire to twist and be pinched or scissored between the narrow wheel rim edges and the pavement. With the subject integral tire and wheel design, by bonding the tire over a large wheel area, which includes both the outer surfaces of rim 44 and wheel body portion 48, even when deflated tire 10 retains its orientation on wheel 12 and engages no narrow or sharp edges on the wheel, thereby enabling the car to be slowed and thereafter driven limited distances without destroying the tire carcass. The limited run-flat capability of the subject integral tire and wheel design offers the opportunity to eliminate the added weight and cost of a spare tire, particularly for cars driven primarily in urban areas which are usually readily accessible to tire repair facilities.

In the event of a puncture, integral inner tube member 14 may be repaired by a conventional, externally inserted plug technique. Likewise, tire 10 may have a retread applied thereto at such time as tread 38 becomes worn. However, at such time as tire 10 becomes unrepairable, it is intended that the integral tire and wheel be replaced in its entirety. Such tire and wheel replacement is economically justified for several reasons. First, by casting or molding the tire so as to provide the integral wheel cover portion 56, the original cost of a wheel cover is eliminated. Next, because of the relatively simple flat rim design, wheel 12 may be a one-piece stamping rather than a multi-part or cast construction, thereby substantially reducing the wheel cost. Further, inasmuch as the exterior of wheel 12 is completely covered by tire 10 and, thus, not an aesthetic part of a vehicle, no finishing of the wheel is necessary, further reducing its cost of manufacture.

It is apparent that other modifications of the subject integral tire and wheel assembly may be made within the scope of the invention as set forth in the hereinafter appended claims.

What is claimed is:

1. An integral wheel and pneumatic tire assembly comprising:
   a wheel having
       a generally radially extending body portion, said body portion including inner and outer surfaces,
       a flat rim portion extending generally horizontally from the upper end of said body portion and cantilever-supported therefrom;
   a tire having
       an elastomeric annular tube member being generally oval in cross section and including
           a pair of transversely spaced, arcuate, inner and outer side walls,
           a first relatively flat crown portion connecting the upper ends of said side walls,
           a second relatively flat portion connecting the lower ends of said side walls and disposed superadjacent said wheel rim portion,
           a circumferential mid-plane generally normal to the rotative axis of said wheel and midway between said side walls, said wheel body portion being laterally offset throughout its radial length from said circumferential plane toward said outer side wall;
       a reinforced elastomeric carcass formed about said tube member, said carcass including
           laterally spaced inner and outer side walls,
           a ground-engaging tread intermediate the radially outer ends of said carcass side walls,
       a flat rim-engaging portion intermediate the radially inner ends of said carcass side walls, said rim-engaging portion being bonded to said wheel rim portion, a wheel covering portion integrally formed with and extending radially inwardly from the outer side wall of said carcass, said wheel covering portion being coextensive with and bonded to the outer surface of said wheel body portion.

2. An integral wheel and pneumatic tire assembly as set forth in claim 1 wherein the wheel covering portion of said tire includes a plurality of integral fin elements extending radially from said annular hub and terminating proximate the radially inner end of the carcass outer side wall.

3. An integral wheel and pneumatic tire assembly as set forth in claim 2 wherein aligned air holes are formed through said wheel body portion and the wheel covering portion of said tire intermediate adjacent of said fin elements.

* * * * *